United States Patent [19]

Matsui et al.

[11] 4,001,823
[45] Jan. 4, 1977

[54] PULSE RADAR METHOD AND SYSTEM

[75] Inventors: Takeshi Matsui, Kariya; Matatoyo Hinachi, Nagoya; Masao Kotera, Okazaki, all of Japan

[73] Assignee: Nippon Soken, Inc., Nishio, Japan

[22] Filed: Oct. 3, 1975

[21] Appl. No.: 619,474

[30] Foreign Application Priority Data

Oct. 5, 1974 Japan ............................ 49-114855

[52] U.S. Cl. ......................... 343/7 A; 343/7 VM; 343/13 R
[51] Int. Cl.² .......................................... G01S 9/06
[58] Field of Search ............. 343/7 A, 7 VM, 13 R

[56] References Cited
UNITED STATES PATENTS 3,824,592  7/1974  Mehltretter ................ 343/7 VM X Primary Examiner—T.H. Tubbesing
Attorney, Agent, or Firm—Cushman, Darby & Cushman

[57] ABSTRACT

A pulse radar system which is designed for installation on a vehicle. A control pulse generating circuit is triggered by the trailing edge of a transmitting pulse to generate a pulse train consisting of 8 time-divided pulses which in turn are supplied to a distributor. Simultaneously, the echo of the transmitted pulse is demodulated and the resulting signal is applied to the distributor so that depending on which one of the 8 divided pulses corresponds to the applied demodulated signal, the distance to the target is displayed on the corresponding indicator.

5 Claims, 8 Drawing Figures

PULSE RADAR METHOD AND SYSTEM

BACKGROUND OF THE INVENTION

1. Field of the Invention

The present invention relates to an improved pulse radar system which may for example be mounted on a vehicle to detect targets existing in the direction of movement of the vehicle and which may be particularly useful in applications where a plurality of paths are provided for the reflected waves from the target.

2. Description of the Prior Art

Pulse radar systems for detecting the relative distance to targets are known in the art in which the radar signals consisting of high frequency pulsed signals are transmitted against a target so that the echo pulse received in response to the sending of each radar pulse is integrated to remove the noise component and the resulting signal is considered as the reflected signal from the target to obtain the required distance information in accordance with the time delay between the transmission and the reception of the pulse. However, if such pulse radar system is mounted on a vehicle, for example, in addition to the reflected pulses from a target which are directly returned to the radar receiver, there are many echo pulses which are rereflected from the ground or other targets and indirectly returned to the radar receiver and therefore the sum effect (hereinafter referred to as a multipath effect) of these pulses tends to cancel the inputs to the receiver despite the presence of the target. For this reason, a method of processing signals through a simple integration as used in the conventional pulse radar system has the danger of generating an erroneous output signal indicating the non-existence of target despite the actual presence of the target when the absence of received signals due to the multipath effect lasts over a relatively long period of time. This means that where such pulse radar system is used as an auxiliary device for safe driving of a vehicle during the night or in the fog rain, the use of the pulse radar system tends to expose the driver to danger despite its intended purpose of fail safe.

SUMMARY OF THE INVENTION

With a view to overcoming the foregoing difficulty, it is an object of the present invention to provide a pulse radar system of the type designed to repeatedly perform at a predetermined frequency a unit radar operation consisting of sending out a radar pulse, obtaining a received pulse from the signal traveled to and reflected from a target and generating a detection signal when the time interval between the received pulse and the original transmitted pulse corresponds to a predetermined range interval to the target, wherein the detection signals are integrated in synchronism with the predetermined frequency, whereby when the resultant integrated value is greater than a predetermined level, the presence of the target is detected and the rate of decrease of the integrated value is changed to a reduced value thereby performing the target detecting operation with a high degree of accuracy and preventing the occurrence of erroneous operation due to the multipath effect.

DESCRIPTION OF THE PREFERRED EMBODIMENT

The present invention will now be described in greater detail with reference to the illustrated embodiment.

Figure 1:
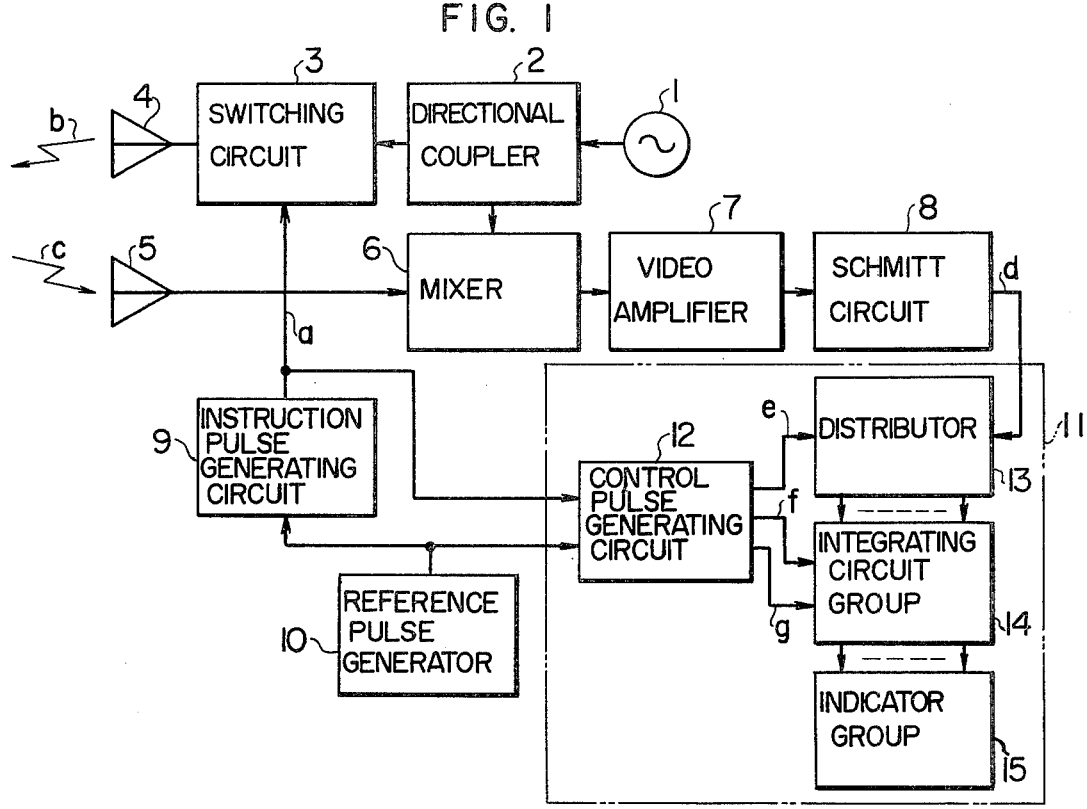
FIG. 1 is a block diagram showing an embodiment of a pulse radar system according to the present invention.

FIG. 1 is a block diagram showing the general construction of a pulse radar system according to the invention. In FIG. 1, numeral 1 designates a microwave oscillator for oscillating to continously generate a microwave, 2 a directional coupler for directing straight ahead the microwave from the microwave oscillator 1 and directing a portion of the microwave to other direction. Numeral 3 designates a switching circuit for modulating the microwave transmitted through the directional coupler 2 with an instruction pulse $a$ having a predetermined frequency. The modulated radar pulses $b$ are radiated in a given direction through a transmitting antenna 4. Namely, the transmitting antenna 4 is mounted on the front part of the vehicle and the transmitter pulses or the radar pulses $b$ are radiated toward the front of the vehicle. Numeral 5 designates a receiving antenna mounted on the front part of the vehicle for receiving reflected pulses $c$ or the radar pulses $b$ radiated from the transmitting antenna 4 and traveled to and reflected from targets, i.e., fixed obstructions, preceding vehicles or approaching vehicles. Numeral 6 designates a mixer for homodyning the local wave from the directional coupler 2 and the reflected pulse $c$ or the receiver pulse received through the receiving antenna 5 to produce a video signal, 7 a vedeo amplifier for amplifying the video signal generated from the mixer 6, 8 a Schmitt circuit for reshaping the amplified signal from the video amplifier 7 into a rectangular pulse $d$ which is generated at the instant that the reflected pulse $c$ arrives at the receiving antenna 5. Numeral 9 designates an instruction pulse generating circuit for generating instruction pulses $a$ of a predetermined frequency which direct the modulation by the switching circuit 3, and in the illustrated embodiment the instruction pulse generating circuit 9 is designed to frequency-divide and reshape the output reference pulses from a reference pulse generator 10 which oscillates at a predetermined reference frequency. The arrangement described so far is the same with that of the ordinary pulse radar system which is known in the art as a pulse radar system used in an aircraft, for example.

The microwave oscillator 1, the directional coupler 2, the switching circuit 3 and the transmitting antenna 4 constitute a transmitter, while a receiver is constituted by the receiving antenna 5, the mixer 6, the video amplifier 7 and the Schmitt circuit 8, and the transmitting and receiving antennas 4 and 5 may be replaced with a single transmitting and receiving antenna. Numeral 11 designates a computing circuit wherein the relative distance to a target is measured and computed with a high degree of accuracy in response to the radiation of radar pulses $b$ and the resultant information is indicated, 12 a control pulse generating circuit synchronized with the instruction pulses $a$ and adapted for subjecting the reference pulses generated from the reference pulse generator 10 to frequency-division and logical operation to generate, for each period of the instruction pulse $a$, a range gate pulse train $e$ consisting of 8 pulses and a single computation pulse $f$ after the termination of the range gate pulse train $e$ and generate a time constant modification pulse $g$ having a frequency lower than that of the compution pulse $f$. Numeral 13 designates a distributor for initiating the distributing operation by the range gate pulse train $e$ in synchronism with the instruction pulses $a$ and distributing the reshaped pulses $d$ to 8 time intervals in accordance with the time intervals between the generation of the instruction pulses $a$ and the generation of the reshaped pulses $d$ to generate detection signals at the output terminals, that is, the time interval between the radiation of the radar pulse $b$ and the arrival of the reflected pulse is measured and a detection signal is generated when the measured value comes within a certain range and the relative distance from a vehicle to the target corresponds to a predetermined time interval. Numeral 14 designates an integrating circuit group including a separate integrating circuit for each of the 8 time intervals distributed by the distributor 13 with each integrating circuit being adapted to integrate the detection signals in response to the generation of the computation pulses $f$ with the result that when the integrated value exceeds a predetermined level, a confirmation signal is generated and the rate of decrease of the integrated value is changed to a reduced value. In other words, the amount of increase in the integrated value upon generation of the detection signal is always determined by the frequency of the computation pulse $f$ and the amount of decrease in the integrated value caused by the loss of the detection signal is varied depending on the frequency of selected one of the computation pulse $f$ and the time constant modification pulse $g$. Numeral 15 designates an indicator groups including a separate indicator for each of the 8 time intervals distributed by the distributor 13 and giving an indication in response to the generation of the confirmation signal from the integrating circuit group 14.

Figure 2:
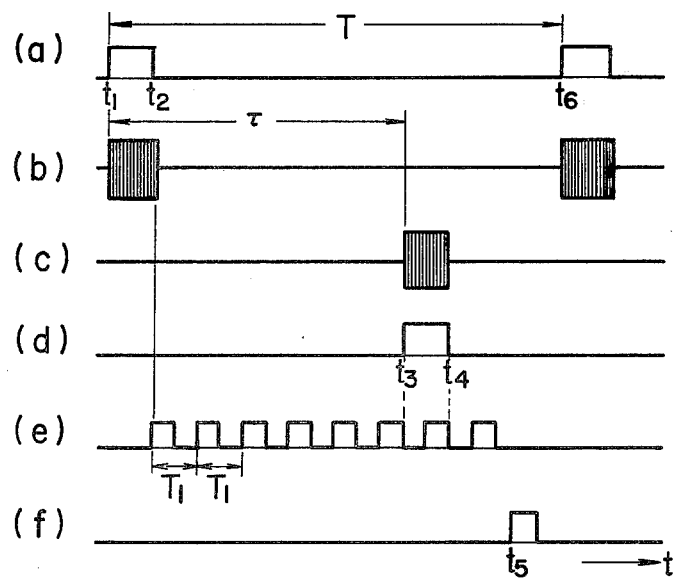
FIG. 2 is a diagram showing the waveforms generated at various points in the system of FIG. 1 which are useful in explaining its operation.

With the construction described above, the operation of this embodiment will now be described with reference to the waveform diagram of FIG. 2. In the waveform diagram of FIG. 2, (a) shows the instruction pulse $a$ generated from the instruction pulse generating circuit 9, (b) the radar pulse $b$ radiated from the transmitting antenna 4, (c) the reflected pulse $c$ received by the receiving antenna 5, (d) the reshaped pulse $d$ generated from the Schmitt circuit 8, and (e) and (f) the range gate pulse train $e$ and the computation pulse $f$ generated from the control pulse generating circuit 12.

Now the radar operation, i.e., the operation of detecting a target ahead of a vehicle in accordance with the instruction pulses $a$ generated from the instruction pulse generating circuit 9 by frequency-dividing the reference pulses generated from the reference pulse generator 10, will be described with reference to the unit radar operation which recurs at intervals of $10^{-l}$ seconds ($l$ is a natural number), namely, the radar operation during one period T of the instruction pulse $a$. When the instruction pulse generating circuit 9 generates an instruction pulse $a$ having a time width extending from a time $t_1$ to a time $t_2$ as shown in FIG. 2(a), the instruction pulse $a$ is applied to the switching circuit 3 and the control pulse generating circuit 12. The switching circuit 3 pulse-modulates the continuous wave form microwave applied thereto from the microwave generator 1 through the directional coupler 2 and consequently the radar pulse $b$ shown in FIG. 2(b) is radiated ahead of the vehicle by the transmitting antenna 4. Since this radar pulse $b$ encounters and is reflected from a target such as a fixed obstruction ahead of the vehicle, a proceeding vehicle, a vehicle ahead of the proceeding vehicle or an approaching vehicle, if, for example, the target is within a predetermined range ahead of the vehicle, the reflected pulse $c$ shown in FIG. 2(c) returns to the receiving antenna 5 at a time delayed by a delay time $\tau$ from the time $t_1$ at which the radar pulse $b$ was radiated. In this case, the duration of the delay time $\tau$ is proportional to the relative distance to the target. The reflected pulse $c$ is applied through the receiving antenna 5 to the mixer 6 where the reflected pulse $c$ is homodyned with the local wave from the directional coupler 2 and the homodyne output is converted through the video amplifier 7 and the Schmitt circuit 8 into the reshaped pulse $d$ having a time width extending from a time $t_3$ to a time $t_4$ as shown in FIG. 2(d).

On the other hand, at the instant that the instruction pulse $a$ is applied to the control pulse generating circuit 12 at the time $t_1$, the control pulse generating circuit 12 generates, in accordance with the reference pulses from the reference pulse generator 10, the range gate pulse train $e$ shown in FIG. 2(e) for time dividing one period of the instruction pulse $a$ into eight time intervals. Namely, at the time $t_2$ when the instruction pulse $a$ falls to zero, the first pulse is generated after which the second, . . ., . . . , and eight pulses are generated with a period or a fixed time interval $T_1$. Consequently, the distributor 13 which performs the distribution operation in accordance with the range gate pulse train $e$, generates a detection signal at its output terminal corresponding to the seventh pulse to distribute the reshaped pulse $d$ generated from the Schmitt circuit 8. That is, if a detection pulse is generated at the output terminal corresponding to the first pulse in the range gate pulse train $e$, it is an indication that the relative distance to the target is within the range corresponding to the first preset time interval. Similarly, the second, third, fourth, fifth, sixth, seventh and eighth pulses respectively correspond to the ranges of the second, third, fourth, fifth, sixth, seventh and eighth preset time intervals and therefore the detection signal at the output terminal corresponding to the seventh pulse indicates that the target is present in the seventh preset time interval which is within the unit range of the seventh longest relative distance. Thereafter, after the generation of the eighth pulse, the computation pulse $f$ shown in FIG. 2(f) is generated from the control pulse generating circuit 12 and applied to the integrating circuit group 14 in which the integrating circuit receiving the detection signal performs the integration operation corresponding to the single computation pulse $f$.

The above-described unit radar operation is repeated for each period of the instruction pulses $a$ to accomplish the radar operation for detecting the relative distance to the target ahead of the vehicle.

In other words, by repeating the above described unit radar operation in synchronism with the predetermined frequency, the integrating circuit in the integrating circuit group 14 which receives for example the detection signals indicating the presence of the target in the seventh preset time interval, integrates the detection signals in response to the generation of the computation pulses $f$ so that at the instant that the integrated value reaches a predetermined level the presence of the target in the seventh time interval is finally confirmed to generate a confirmation signal and this confirmation signal is displayed on the corresponding indicator in the indicator group 15. In addition, once the conformation signal has been generated from the integrating circuit, the time constant modification pulse $g$ and the computation pulse $f$ generated from the control pulse generating circuit 12 are selectively introduced to change the rate of decrease of the integrated value to a reduced value. In this way, the loss of the detection signals due to the multipath effect which is frequently caused when a pulse radar system is mounted on a vehicle, can be prevented from causing the system to operate erroneously and the confirmation signal can be generated with improved accuracy and stability thus preventing any undesired interruption of the indication operation in the indicator group 15. While, in this embodiment, the above-mentioned predetermined level of the integrated value is selected ¾ (75%), any other level, as for example, a level of one-third may be used.

Figure 3:
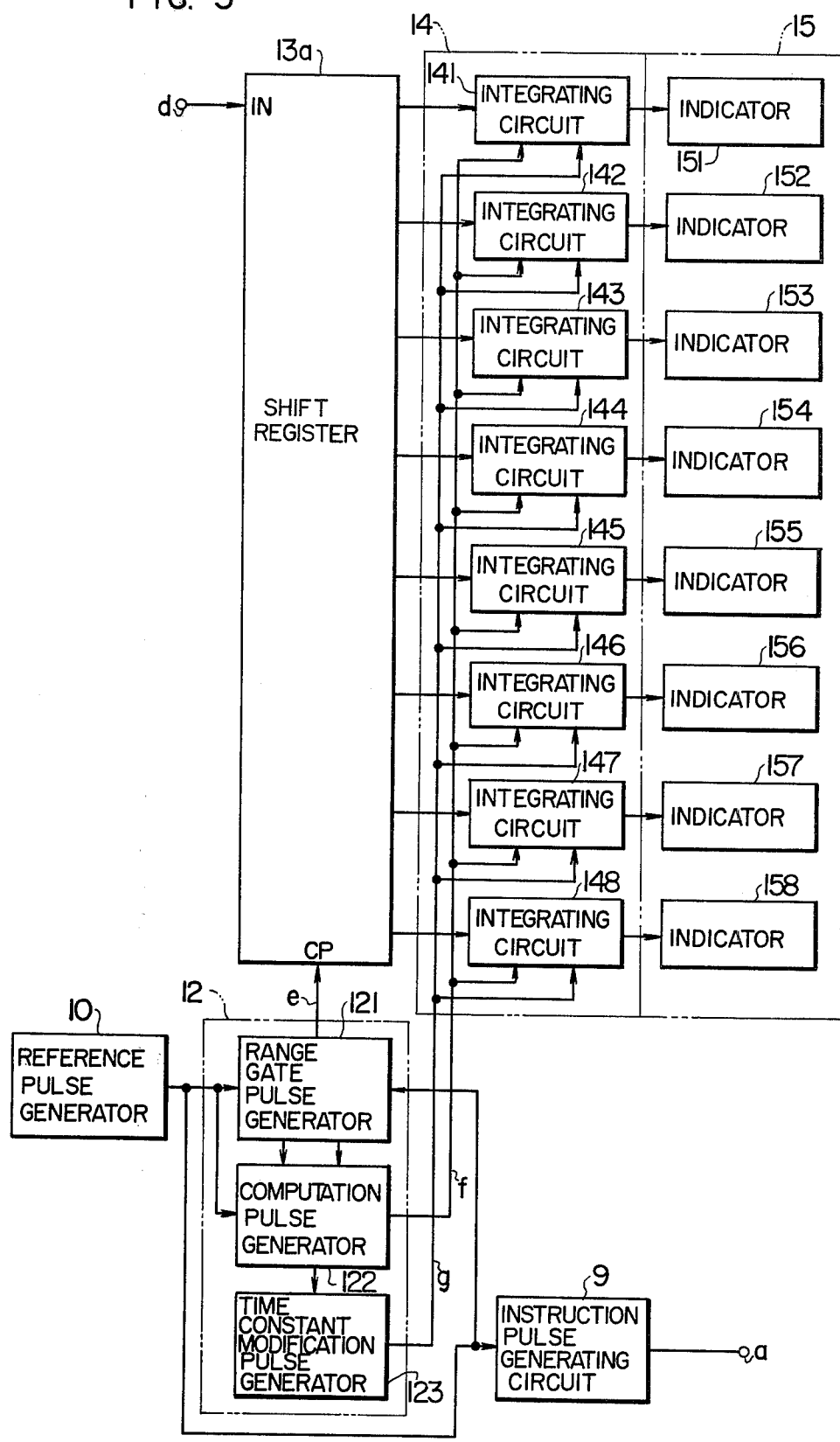
FIG. 3 is a detail block diagram showing the detailed construction of the principal units of the system shown in FIG. 1.

Next, the computing circuit 11 constituting the principal part of the system shown in FIG. 1 will be described. FIG. 3 illustrates a detail block diagram showing the detailed construction of the computing circuit 11. In FIG. 3, the distributor 13 comprises a serial-in, parallel-out shift register 13a wherein the reshaped pulses $d$ generated from the Schmitt circuit 8 are applied to an input terminal IN and the range gate pulse trains $e$ are applied to a clock terminal CP thereby delivering distributed detection signals from its eight output terminals. Numerals 141, 142, 143, 144, 145, 146, 147 and 148 designate integrating circuits constituting the integrating circuit group 14. The integrating circuits 141 through 148 are all of the same circuit construction and each of them separately receives the detection signals from the associated output terminal of the shift register 13a in addition to the computation pulses $f$ and the time constant modification pulse $g$ to thereby generate a confirmation signal. Numerals 151, 152, 153, 154, 155, 156, 157 and 158 designate indicators constituting the indicator group 15, which are of the same type and respectively receive the confirmation signal from the integrating circuits 141 through 148 to give an indication. Numeral 121 designates a range gate pulse train generator wherein in synchronism with the generation of the instruction pulses $a$ the reference pulses from the reference pulse generator 10 are subjected to frequency division and logical operation thereby generating for each period of the instruction pulses $a$ a range gate pulse train $e$ comprising 8 pulses and dividing each period of the instruction pulse $a$ into 8 time intervals. Numeral 122 designates a computation pulse generator which receives the reference pulses and the output signal of the range gate pulse train generator 121 generated while the latter is performing the logical operation to generate a computation pulse signal $f$ consisting of a single pulse after the generation of the 8 pulses of every range gate pulse train $e$ has been completed, namely, each computation pulse $f$ is generated at a time immediately before the end of every period of the instruction pulse $a$. Numeral 123 designates a time constant modification pulse generator which receives the output signal of the computation pulse generator 122 generated during the logical operation so that a single output pulse is generated for every N computation pulses $f$ generated, thus generating a time constant modification pulse $g$ of a frequency which is 1/N of that of the computation pulse $f$.

Figure 4:
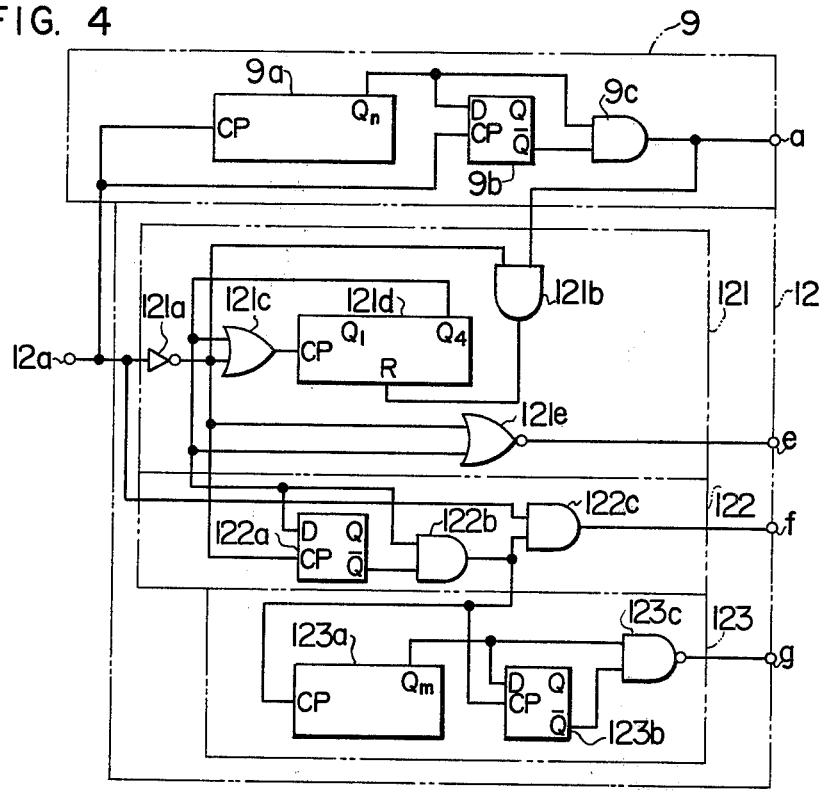
FIG. 4 is a wiring diagram showing the detailed construction of the control pulse generating circuit shown in FIG. 3.

Next, the control pulse generating circuit 12 and the instruction pulse generating circuit 9 shown in FIG. 3 will be described in detail. FIG. 4 is a wiring diagram showing the detailed arrangement for generating the control pulses including the range gate pulse trains $e$, computation pulses $f$ and time constant modification pulses $g$. Referring first to the instruction pulse generating circuit 9, numeral 9a designates a counter for dividing the frequency of the reference pulses to generate at its $Q_n$ output a frequency divided signal which changes from one level to another for every $2^n$ reference pulses applied ($n$ is a natural number), 9b a data flip-flop which receives the divided signal as a data input and the reference pulses as a clock input to store the level of the data input each time the reference pulse is applied thereto, 9c an AND gate for performing the AND operation on its two inputs, i.e., the divided signal and the stored signal from the $\overline{Q}$ output of the date flip-flop 9b to generate, each time the divided signal goes to the high level, an instruction pulse having a time width corresponding to one period of the reference pulse.

In the range gate pulse train generator 121 which receives the instruction pulse $a$ and the reference pulses, numeral 121a designates an inverter for inverting the phase of the reference pulses, 121b an AND gate for generating a reset pulse in response to the inverted reference pulse from the inverter 121a upon generation of the instruction pulse $a$, 121c an OR gate for performing the OR operation on its two inputs, 121d a counter which is reset by the reset pulse to count the inverted reference pulses so that each time the count of the inverted reference pulses reaches 8, its $Q_4$ output goes to the high level and the OR gate 121c is closed by this high level locking signal to stop the counting operation, and this interlocking operation is repeated in synchronism with the reset operations, 121e a NOR gate for performing the NOR operation on its two inputs, which phase-inverts and passes every 8 inverted reference pulses prior to the interlocking operation by the counter 121d to generate a range gate pulse train $e$.

In the computation pulse generator 122 which receives the reference pulses $a$, the inverted reference pulses and the locking signals, numeral 122a designates a data flip-flop which receives the locking signal as a data input and the inverted reference pulse as a clock input to store the high or low level of the date input each time the inverted reference pulse is applied thereto, 122b an AND gate whereby a computation instruction pulse having a time width corresponding to one period of the inverted reference pulse is generated in response to the locking signal and the stored signal from the Q output of the date flip-flop 122a each time the locking signal is generated, 122c an AND gate for passing the reference pulse in response to the generation of the computation instruction pulse and generating a computation pulse f.

In the time constant modification pulse generator 123 which receives the computation instruction pulses, numeral 123a designates a counter for counting and frequency dividing the computation instruction pulses to generate at its $Q_m$ output a divided signal which changes from one level to another in response to every N computation instruction pulses applied (N is a natural number), 123b a data flip-flop for storing the high or low level of the data input or the divided signal each time the computation instruction pulse is applied, 123c a NAND gate for performing the NAND operation on its two inputs, namely, a time constant modification pulse g having a time width corresponding to one period of the computation instruction pulse is generated in response to the divided signal and the stored signal from the $\overline{Q}$ output of the data flip-flop 123b each time the divided signal goes to the high level.

Figure 5:
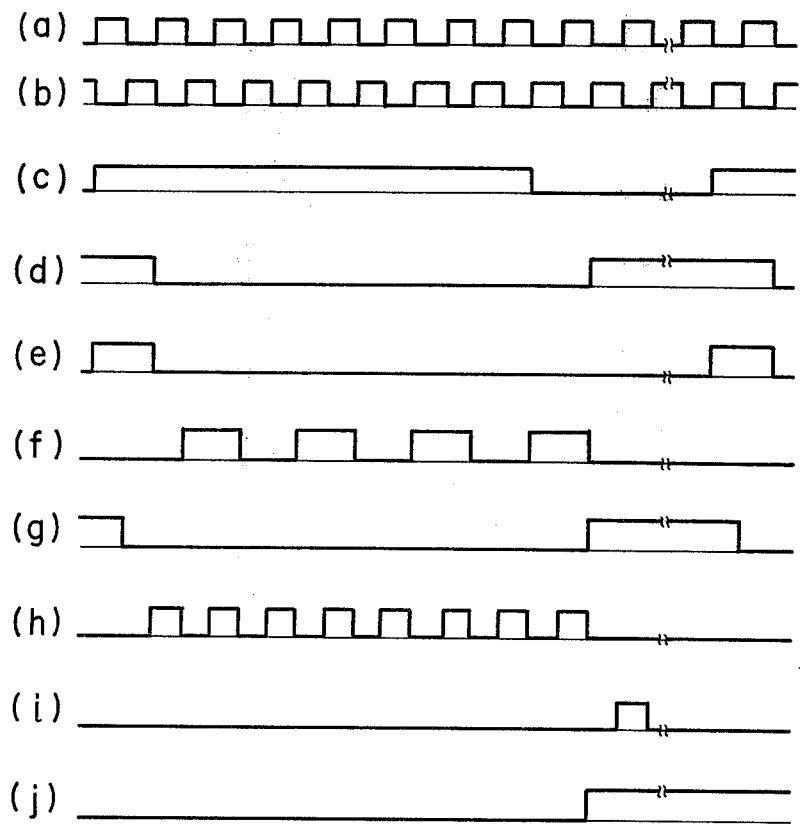
FIG. 5 is a diagram showing the waveforms generated at various points in the circuit of FIG. 4 which are useful in explaining its operation.

With the construction described above, the control pulse generating operation will now be described in reference to the waveform diagram of FIG. 5. When the reference pulses shown in FIG. 5(a) are applied to an input terminal 12a from the reference pulse generator 10, the applied reference pulses are counted and frequency-divided by the counter 9a in the instruction pulse generating circuit 9 and the divided signal shown in FIG. 5(c) is generated at the $Q_n$ output. Consequently, the data flip-flop 9b comes into operation and generates at its $\overline{Q}$ output the stored signal shown in FIG. 5(d), so that the instruction pulse a shown in FIG. 5(e) is generated from the AND gate 9c and applied to the switching circuit 3 and the range gate pulse train generator 121. On the other hand, the phase of the reference pulses is inverted by the inverter 121a in the range gate pulse train generator 121 thus generating the inverted reference pulses shown in FIG. 2(b), and the inverted reference pulses and the instruction pulse a are applied to the AND gate 121b thus generating a reset pulse. The reset pulse is then applied to the counter 121d which in turn starts counting the inverted reference pulses applied thereto through the OR gate 121c. Consequently, the signals shown in FIG. 5(f) and obtained by subjecting the inverted reference pulses to a ½ frequency division are generated at the $Q_1$ output of the counter 121d and also generated at its $Q_4$ output is the locking signal shown in FIG. 5(g) which remains at the low level until the count of the applied inverted reference pulses reaches 8 and which remains at the high level during the time in which the 9th to 16th pulses are applied. This locking signal is applied to the OR gate 121c and the NOR gate 121e, so that the high level locking signal opens the OR gate 121c to actuate the interlocking operation, whereas the NOR gate 121e passes 8 pulses of the inverted reference pulses applied thereto prior to the actuation of the interlocking operation thus generating the range gate pulse train e shown in FIG. 5(h). The locking signal and the inverted reference pulses are also applied to the data flip-flop 122a and the AND gate 122d in the computation pulse generator 122 causing them to operate in the similar manner as the data flip-flop 9b and the AND gate 9c in the instruction pulse generating circuit 9. Consequently, a computation instruction pulse having a time width corresponding to one period of the inverted reference pulse is generated each time the locking signal goes to the high level and this computation instruction pulse is applied, along with the reference pulses, to the AND gate 122c thus generating the computation pulse f shown in FIG. 5(i). The counter 123a, the data flip-flop 123b and the NAND gate 123c which when combined together are practically identical with the instruction pulse generating circuit 9 operate in the similar manner as the latter circuit in response to the computation instruction pulse and generate the time constant modification pulse shown in FIG. 5(j).

Figure 6:
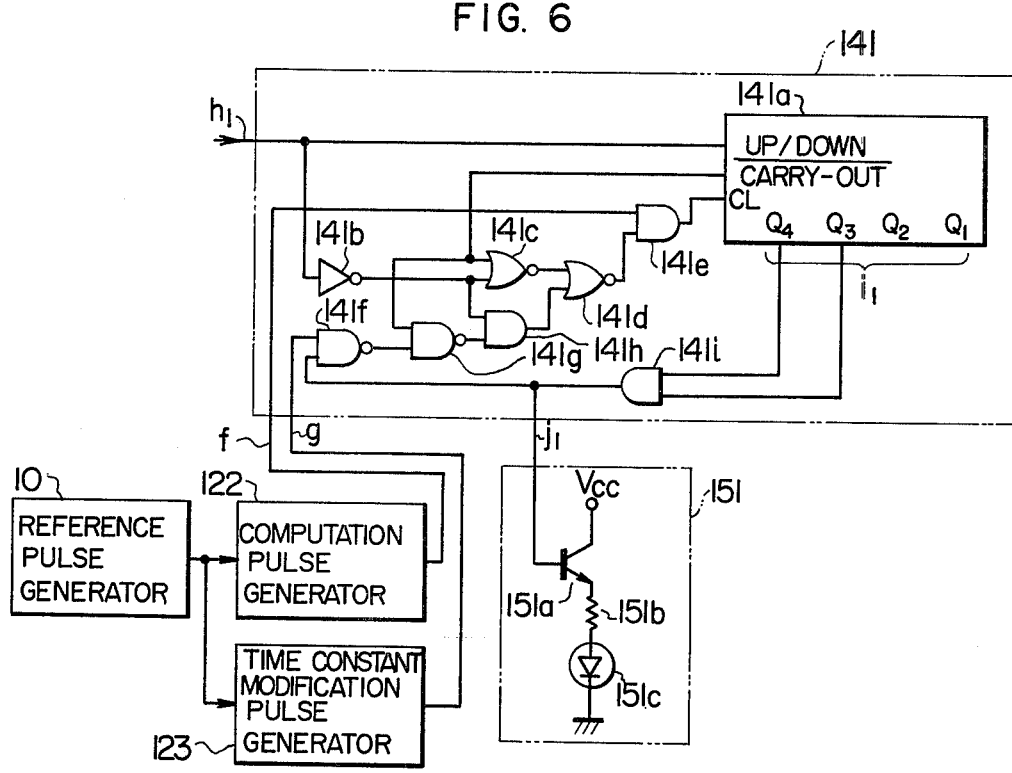
FIG. 6 is a wiring diagram showing the detailed construction of the integrating circuit and indicator shown in FIG. 3.

Next, the integrating circuit group 14 and the indicator group 15 will be described in detail. FIG. 6 is a wiring diagram showing the detailed construction of an integrating circuit 141 and an indicator 151 corresponding to the first preset time interval. Referring first to the integrating circuit 141, numeral 141a designates an up/down counter wherein when its up/down input is at a "1" level, the counter counts up, whereas when the up/down input is at a "0" level, the counter counts down, and pulses applied to its input CL are counter and integrated so that the count or integrated value is generated at its $Q_1$, $Q_2$, $Q_3$ and $Q_4$ outputs and its CARRY-OUT output goes to the "0" level only at the saturation, namely, only when the count of the up counting attains the maximum value "1111" or the count of the down counting attains the minimum value "0000", whereas the CARRY-OUT output remains at the "1" level during the normal counting operation. Numeral 141b designates an inverter for inverting the phase of the detection signal of the shift register 13a which is applied to the up/down input, 141c and 141d NOR gates for performing the NOR operation on their respective two inputs, 141e an AND gate for performing the AND operation on its two inputs, whose one input terminal receives the computation pulses f, 141f a NAND gate for performing the NAND operation on its two inputs, whose one input terminal receives the time constant modification pulse g, 141g a NAND gate for performing the NAND operation on its two inputs, 141h an AND gate for performing the AND operation on its two inputs, 141i an AND gate for performing the AND operation on its two inputs, which generates a "1" level confirmation signal when the count of the counter 141a attains a preset level "1100".

In the indicator 151 connected to the integrating circuit 141, numeral 151a designates a transistor which is turned on by the confirmation signal, 151b a protective resistor for limiting the flow of current when the transistor 151a is turned on, 151c a light emitting diode which is lighted and gives an indication when the transistor 151a is turned on and this indication informs the driver of the presence of the target determined by the confirmation signal.

The integrating circuit 141 and the indicator 151 are respectively identical in construction with the other integrating circuits 142 through 148 in the integrating circuit group 14 and the other indicators 152 through 158 in the indicator group 15 which correspond to the other preset time intervals except that the integrating circuits 142 through 148 receive the detection signals of the shift registers 13a from the other output terminals respectively corresponding to the other preset time intervals.

Figure 7:
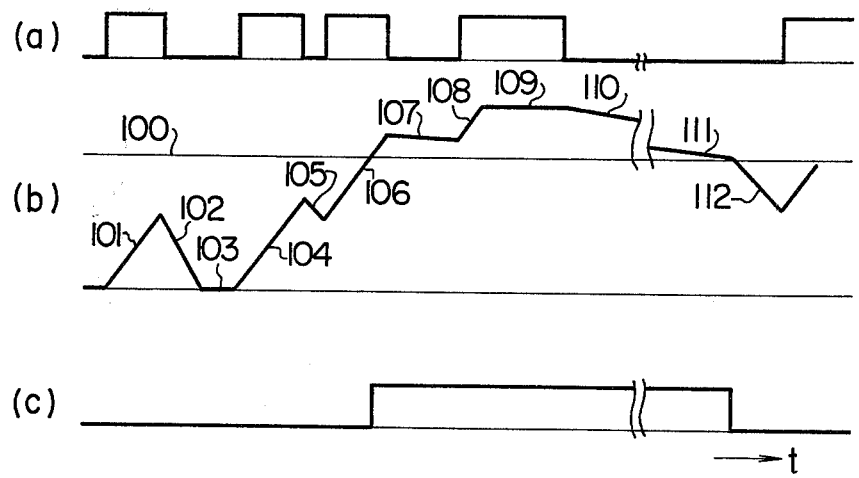
FIG. 7 is a diagram showing the waveforms generated at various points in the circuit of FIG. 6 which are useful in explaining its operation.

With the construction described above, the integration operation will now be described with reference to the waveform diagram of FIG. 7. In FIG. 7, the abscissa t continuously indicates only those times at which the computation pulses f are generated, (a) indicates the detection signal of the shift register 13a corresponding to the first preset time interval, (b) the count $i_1$ of the counter 141a, and (c) the confirmation signal $j_1$ generated from the AND gate 141i.

When the detection signal $h_1$ generated at the output terminal of the shift register 13a corresponding to the first preset time interval goes to the "1" level, the up/down input of the up/down counter 141a goes to the "1" level. If, at this time, the contents of the counter 141a does not reach the maximum value "1111" and thus the count is not at its maximum, the CARRY-OUT output goes to the "1" level causing the output of the NOR gate 141c to go to the "0" level, the output of the AND gate 141h to the "0" level and the output of the NOR gate 141d to the "1" level. Consequently, the AND gate 141e is opened and the output of the computation pulse generator 122 or the computation pulses $f$ are applied to the up/down counter 141a causing it to count up. When this occurs, the contents of the counter 141a or the integrated value varies as shown at 101, 104, 106 and 108 in FIG. 7(b). On the other hand, if the contents of the counter 141a attain the maximum value "1111" and hence the maximum count, the AND gate 141e is closed and the counter 141a stops its up counting operation to prevent the occurrence of an overflow. The resulting integrated value is represented at 109 in FIG. 7(b).

When the detection signal $h_1$ goes to the "0" level, the up/down input goes to the "0" level. If, at this time, the contents of the counter 141a have attained the minimum value "0000" and hence the saturated condition, the CARRY-OUT output goes to the "0" level causing the output of the NOR gate 141c to go to the "0" level, the output of the NAND gate 141g to go to the "1" level, and the output of the AND gate 141h to the "1" level and the output of the NOR gate 141d to the "0" level. Consequently, the AND gate 141e is closed and the counter 141a stops its down counting operation to prevent the occurrence of an underflow. The resulting integrated value is represented at 103 in FIG. 7(b).

On the other hand, if the contents of the counter 141a are not reduced to the minimum value "0000" but smaller than the preset level "1100", the CARRY-OUT output goes to the "1" level so that the output of the AND gate 141i or the level decision element goes to the "0" level, the output of the NAND gate 141f to the "1" level, the output of the NAND gate 141g to the "0" level and the output of the AND gate 141h to the "0" level. At this time, the output of the NOR gate 141c is also at the "0" level so that the AND gate 141e is opened and the output computation pulses $f$ of the computation pulse generator 122 are applied to the counter 141a causing the latter to count down. When this occurs, the contents of the counter 141a or the integrated value varies as shown at 102, 105 and 112 in FIG. 7(b). In FIG. 7(b), numeral 100 designates the preset level or the criterion for the AND gate 141i constituting the level decision element.

Further, when the detection signal $h_1$ goes to the "0" level and the contents of the counter 141a are greater than the preset level "1100", the output of the AND gate 141i goes to the "1" level. The time constant modification pulse generator 123 is designed to generate a time constant modification pulse $g$ of 1/N frequency which remains at the "0" level until the computation pulse generator 122 completes the generation of the first output or computation pulse $f$ but remains at the "1" level during the generation of other N-L computation pulses $f$. Consequently, when the output of the time constant modification pulse generator 123 goes to the "1" level, along with the output of the AND gate 141i, the output of the NAND gate 141f is caused to go to the "0" level, the output of the NAND gate 141g to the "1" level, the output of the NAND gate 141h to the "1" level and the output of the NOR gate 141d to the "0" level, thus closing the AND gate 141e to prevent the counter 141a from counting down.

On the other hand, when the contents of the counter 141a are greater than the preset level "1100", the output of the AND gate 141i is at the "1" level and the output of the time constant modification pulse generator 123 is at the "0" level, the output of the NAND gate 141f goes to the "1" level, the output of the NAND gate 141g to the "0" level and the output of the AND gate 141h to the "0" level. Since the output of the NOR gate 141c is also at the "0" level, the output of the NOR gate 141d goes to the "1" level so that the AND gate 141e is opened to permit the application of the computation pulses $f$ to the counter 141a and cause the counter 141a to count down. In this way, the time constant is increased N times in the integrating circuit 141 and the contents of the counter 141a vary as shown at 107, 110 and 111 in FIG. 7(b). The integrating circuit 141 operates in the manner just described.

The indicator 151 comprises the emitter follower circuit transistor 151a which receives the output of the AND gate or level decision element 141i, the protective resistor 151b and the light emitting diode 151c, so that when the output of the AND gate 141i goes to the "1" level thus generating a confirmation signal $j_1$, the light emitting diode 151c is lighted and gives an indication that a target was detected in the first preset time interval.

While the operations of the integrating circuit 141 and the indicator 151 have been described so far, the other integrating circuits 142 through 148 and the other indicators 152 through 158 also operate similarly.

Further, by virtue of the fact that the individual integrating circuits 141 through 148 in the integrating circuit group 14 and the individual indicators 151 through 158 in the indicator group 15 are respectively associated with the eight preset time intervals independently of each other, the presence of a target within any preset time interval can be detected and indicated separately and it is thus possible to detect and indicate simultaneoulsy the presence of a plurality of targets.

Figure 8:
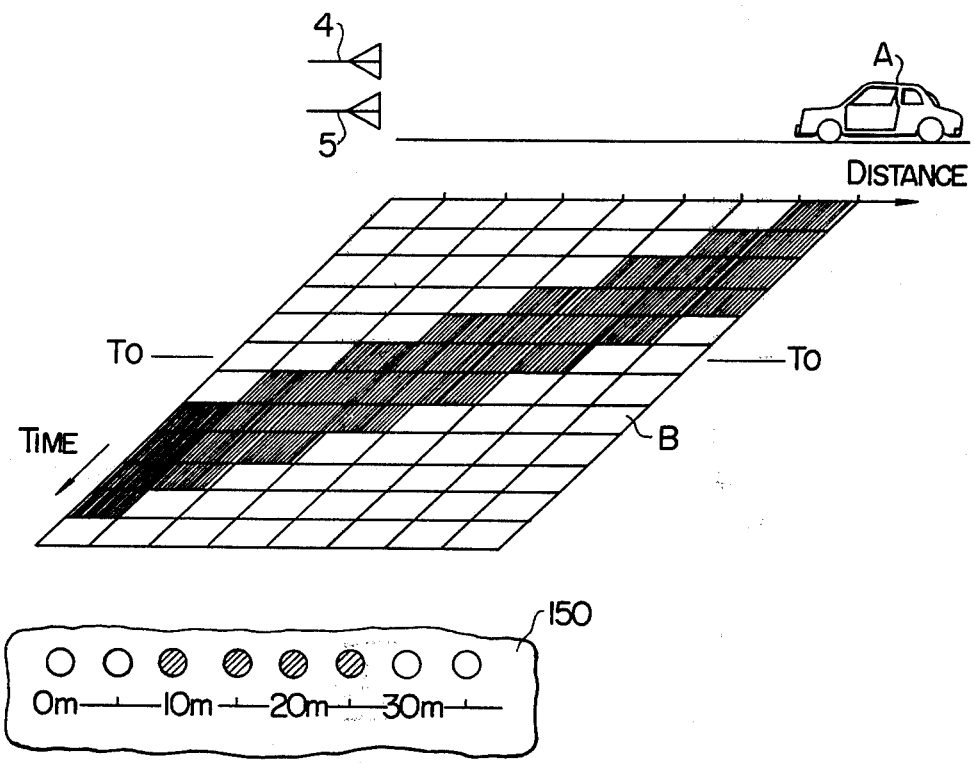
FIG. 8 is a schematic diagram for explaining the method of indication used with the pulse radar system of this invention.

With the operation described above, any external noise, system noise, etc., which is asynchronous with the radar pulses $b$ sent out from the transmitting antenna 4 may be removed through an integration operation and moreover the integration time constant may be varied to provide a holding effect and thereby to compensate for the loss of signals due to the multipath effect and provide a unique indication of targets moving at high speeds as will be described hereinafter. The manner in which a moving target A approaching the transmitting and receiving antennas 4 and 5 is indicated on the indicator group 15 will now be described with reference to the schematic diagram of FIG. 8. In FIG. 8, symbol B designates a typical pattern showing the manner in which the target is successively indicated with the lapse of time on the indicators of the indicator group 15 which correspond to the respective relative distances to the target, and the hatched portions indicate that the target was indicated on the indicators in the indicator group corresponding to the respective distances to the target. In FIG. 8, numeral 150 designates an exemplary form of a panel on which the indicator group is mounted and the panel shows the indications at a time $t_0$. In other words, by virtue of the holding effect provided by the integration operation with a variable integration time constant, the moving target A moving at a high speed may be simultaneously indicated on a plurality of the indicators thereby simultaneously indicating the position and the relative speed of the target A. In this case, the actual position of the target A is represented by the relative distance corresponding to the indicator in the plurality of the indicating indicators which is located at the front end in the direction of the movement of the target.

Although the present invention has been described by means of a specific embodiment thereof, it is not intended to be limited to the illustrated embodiment, since various modifications and changes may be made without departing from the spirit and scope of the invention. For example, while the shift register is used to convert the reshaped pulses generated from the Schmitt circuit into a parallel output, it may be replaced by a group of switches which receives as its input the output of the radar receiver and distributes it into a plurality of outputs corresponding to predetermined range intervals.

Further, while the integration circuit comprises an up/down counter, the up/down counter may for example be replaced with an analog circuit which is capable of varying the time constant in accordance with the integrated value of the integrating circuit in the manner described above.

Still further, while, when the integrated value is decreasing the time constant is increased N times to change the rate of decrease of the integrated value to a reduced value, the time constant may be increased 1/N times when the integrated value is increasing, or alternately the time constant may be varied both when the integrated value is decreasing and when it is increasing.

Furthermore, while the computing circuit 11 comprises 8 units of the parallel circuits respectively corresponding to the eight time intervals which are independently of one another, the desired effect may be obtained with at least one such unit, and moreover the desired computational operation may be carried out in terms of soft-ware by using the ordinary computer.

Still furthermore, the present invention is not limited to radar systems employing microwaves. For example, other waves such as ultrasonic waves may be employed in which case it is necessary to use a transmitter and a receiver that suit the type of waves used.

It should be appreciated that the present invention has a great advantage that since the detection of a target is not accomplished simply on the basis of detection signals obtained during the unit radar operation for each period of a predetermined frequency but accomplished by monitoring the frequency of occurrence of the detection signals, the detection of a target can be accomplished with an improved accuracy and moreover the detection of the target, once it has been confirmed, can be held for a while even if the loss of the detection signals due to the multipath effect lasts over several periods and in this way it is possible to prevent erroneous indication of non-existence of target.

What is claimed is:

1. In a pulse radar system, a method comprising the steps of repeatedly performing a unit radar operation at a predetermined frequency, said unit radar operation including radiating a radar pulse in a predetermined direction, obtaining a received pulse by receiving a reflected signal of said radar pulse which has encountered and reflected from a target located ahead of a sending point of said radar pulse, and recognizing that the time interval between the radiation of said radar pulse and the reception of said received pulse corresponds to one of preset time intervals and generating a detection signal, wherein the improvement comprises the steps of:
    integrating said detection signals in synchronism with said predetermined frequency and confirming the presence of said target when the resulting integrated value has exceeded a predetermined level; and
    changing the rate of decrease of said integrated value to a reduced value simultaneously with said confirmation.

2. A pulse radar system comprising transmitter means for radiating a radar pulse in a predetermined direction and repeating said radiation of radar pulse at a predetermined frequency, receiver means for obtaining a received pulse by receiving a reflected signal of said radar pulse which has encountered and reflected from a target, and detecting means operative in synchronism with the radiation of said radar pulse from said transmitting means for detecting that the time elapsed between the radiation of said radar pulse and the reception by said receiving means of said received pulse corresponding to said radar pulse corresponds to one of preset time intervals and generating a detection signal, wherein the improvement comprises:
    at least one integrating circuit means connected to said detecting means for integrating said detection signals in synchronism with said predetermined frequency and generating a confirmation signal when the resulting integrated value exceeds a predetermined level and simultaneously changing the rate of decrease of said integrated value to a reduced value; and
    load means connected to said integrating circuit means for receiving said confirmation signal and indicating the detection of the presence of said target within a relative distance corresponding to said preset time interval.

3. A system according to claim 2, wherein said pulse radar system is mounted on a vehicle to detect the presence of targets on a road surface on which said vehicle is traveling.

4. A system according to claim 2, wherein said detecting means includes distributor means for initiating a distribution operation with a predetermined period upon radiation of said radar pulse to divide said elapsed time from the radiation of said radar pulse into a plurality of preset time intervals and distribute said received pulse to one of a plurality of output terminals respectively corresponding to said plurality of time intervals, and each of said output terminals of said distributor means is independently connected to said integrating circuit means and said load means.

5. A system according to claim 2, wherein said integrating circuit means includes up/down counter means for additively and subtractively counting said detection signals in synchronism with said predetermined frequency.

\* \* \* \* \*